(12) United States Patent
Bernstein et al.

(10) Patent No.: US 7,090,779 B2
(45) Date of Patent: Aug. 15, 2006

(54) MANUALLY OPERABLE WATER PURIFYING DEVICE

(76) Inventors: Lawrence Allen Bernstein, 6456 Surfside Way, Malibu, CA (US) 90265; Anna Johanna Bernstein, 6456 Surfside Way, Malibu, CA (US) 90265

( * ) Notice: Subject to any disclaimer, the term of this patent is extended or adjusted under 35 U.S.C. 154(b) by 0 days.

(21) Appl. No.: 10/969,161

(22) Filed: Oct. 20, 2004

(65) Prior Publication Data

US 2005/0082235 A1   Apr. 21, 2005

Related U.S. Application Data

(60) Provisional application No. 60/512,428, filed on Oct. 20, 2003, provisional application No. 60/551,138, filed on Mar. 9, 2004.

(51) Int. Cl.
*C02F 1/32* (2006.01)

(52) U.S. Cl. .............. 210/748; 210/117; 210/192; 210/244; 210/416.3; 210/510.1

(58) Field of Classification Search .......... 210/117, 210/136, 192, 243, 244, 416.3, 502.1, 748; 250/430, 435, 436; 422/24, 186.3; 222/189.11, 222/190; 204/660, 665
See application file for complete search history.

(56) References Cited

U.S. PATENT DOCUMENTS

| | | | |
|---|---|---|---|
| 1,333,119 A | 3/1920 | Krag-Möller | |
| 1,336,461 A | 4/1920 | Yackel | |
| 1,399,598 A | 12/1921 | Anderson | |
| 1,472,335 A | 10/1923 | Luzy | |
| 1,483,055 A | 2/1924 | Blot | |
| 1,655,601 A | 1/1928 | Fisher | |
| 1,775,166 A | 9/1930 | Johnson | |
| 2,133,420 A | 10/1938 | Brooks | 240/10.5 |
| 2,436,675 A | 3/1948 | Bardin | 171/209 |
| 4,755,292 A | 7/1988 | Merriam | 210/192 |
| 4,849,100 A | 7/1989 | Papandrea | 210/138 |
| 6,042,720 A * | 3/2000 | Reber et al. | 210/85 |
| 6,348,151 B1 | 2/2002 | Kunkel | 210/209 |
| 6,379,544 B1 * | 4/2002 | Chen | 210/244 |
| 6,767,453 B1 | 7/2004 | Lifschitz | 210/85 |
| 2004/0140267 A1 | 7/2004 | Schiltz | |

FOREIGN PATENT DOCUMENTS

| | | |
|---|---|---|
| DE | 3840276 A1 | 5/1990 |
| DE | 4124843 A1 | 1/1993 |
| DE | 4228860 A1 | 3/1994 |
| GB | 1 421 804 | 1/1976 |
| GB | 2 088 651 | 6/1982 |
| JP | 2000-225391 | 8/2000 |
| JP | 2000-301139 | 10/2000 |
| WO | WO 02/100780 A1 | 12/2002 |

* cited by examiner

*Primary Examiner*—Matthew O. Savage
(74) *Attorney, Agent, or Firm*—Kennedy Covington Lobdell & Hickman, LLP (57) ABSTRACT

A manually operated water purifying device which includes a manually moveable operating member that pumps unpurified water into a conduit where it is exposed to purification by an electrically operated UV-C lamp and then dispensed from a portable container, and the UV-C lamp is energized by an electric generator that is also driven by a manually moveable operating member.

39 Claims, 8 Drawing Sheets

MANUALLY OPERABLE WATER PURIFYING DEVICE

CROSS-REFERENCE TO RELATED APPLICATIONS

This application is entitled to the benefit of, and claims priority to, Provisional U.S. Patent Application Ser. No. 60/512,428, filed Oct. 20, 2003 and entitled "WaterSAFE A Hand Powered Water Purifier With Sink," and provisional U.S. Patent Application Ser. No. 60/551,138, filed Mar. 9, 2004 and entitled "WaterSAFE 2A A Hand Powered Water Purifier W/Sink," the entirety of each of which is also incorporated herein by reference.

BACKGROUND OF THE PRESENT INVENTION

The present invention relates generally to a water purifying device, and more particularly to a manually operable device for purifying water and dispensing the purified water.

The increasing lack of any drinkable water throughout large portions of the world is well documented, and this situation is exacerbated by the fact that in many parts of the world there is also no electrical power, solar power or batteries which are necessary to operate conventional water purifying equipment.

Moreover, even in areas where drinkable water is generally available, there are a significant number of situations where the drinkable water cannot be accessed for various reasons. For example, people who travel to remote areas, such as campers, hikers, and the like, often find that fresh potable water is not available at those areas. Additionally, there is always a risk that the generally available water may become contaminated, at least temporarily, by acts of God, terrorists, and other misfortunes.

As a result, there are a number of devices which are currently available that can be used to filter and/or purify water. For example, there are a number of portable devices which utilize either an activated charcoal filter or a ceramic filter, or both, through which questionable water can be pumped manually to improve the quality of the water. These activated charcoal filters remove some disagreeable components of questionable water, such as bad taste, odors and colorations, but they do not purify the water in a technical sense because they do not remove harmful microbes that may be contaminating the water. The ceramic filters remove some, but not all, of the microbes in the water, and the dense nature of the ceramic filters can significantly increase the pumping power needed to force the water through the ceramic filter.

There are also a number of devices which utilize solar power to operate the water purifier, but these devices obviously depend on the availability of significant sunlight or they are inoperative. Also, even when they are operative, these solar purifiers are slow in operation and often have a low capacity.

Finally, there are electrically-operated water purifiers that include a UV-C lamp which is effective in killing most if not all of the microorganisms in the water by breaking through the microbe's outer membrane to cause modifications in its DNA, which then transmits incorrect genetic codes and kills the microbes. These devices, which may also include activated charcoal and/or ceramic filers in combination with the UV-C lamp, do an excellent job of purifying water that would otherwise be unfit to drink, but all of these devices require an external electrical power source that is connected to energize the UV-C lamp. However, in most remote areas, no such external power source is available, and these devices therefore are not operable in these areas.

Accordingly, there exists a significant need for a device that utilizes an electrically-operated water purifying unit, such as a UV-C lamp, that can kill harmful microorganisms in contaminated water, and that is not dependent on the availability of an external power source to energize the UV-C lamp and/or pump water through and from the purifying device. It is also desirable to provide such a device which is readily portable so that it can be easily carried to remote areas.

SUMMARY OF THE PRESENT INVENTION

Briefly summarized, the present invention provides an apparatus for manually dispensing purified water that comprises a container for holding a supply of water, and a conduit through which the water can be dispensed from the container. An electrically operated water purifying device is mounted in the container to purify water that flows through the dispensing conduit, and an electric generator is disposed within the container and is electrically connected to the water purifying device for operating the water purifying device. A first manually movable member is mounted on the container for movement that pumps water from the container through the conduit to be dispensed from the container, and a second manually movable member is mounted on the container for movement that operates the electric generator to cause the water purifying device to purify the water dispensed from the container through the dispensing conduit.

In a preferred embodiment of the present invention the first manually movable member is a longitudinally extending member that includes a handle portion for manually moving it, and the second manually moveable member is a gear driving device mounted on the longitudinally extending member for movement therewith. The longitudinally extending member is hollow and is telescopically mounted on a vertically extending hollow tube within the container for relative movement therewith to pump the purified water from the container, and the gear driving device is a rack that is connected to a drive train for operating the electric generator. Preferably, the operating member and the hollow tube member are in open fluid communication with one another and the hollow tube member is formed with an opening therein through which water within the container can enter the hollow tube, and a check valve is mounted in the hollow tube member to cause water to flow from the operating member and the hollow tube member through the dispensing conduit when the operating member is manually moved in one direction relative to the hollow tube and to cause water to flow into the hollow tube through the opening therein when the operating member is manually moved in the opposite direction relative to the hollow tube. A compression spring may be disposed within the operating member and hollow tube member to bias the operating member away from the hollow tube.

The water purifying device is preferably a UV-C lamp that is located within the hollow tube member.

The container is preferably formed with a watertight compartment in which the electric generator is mounted, and may also include an inlet opening having an activated charcoal filter mounted therein through which the container can be filled with unpurified water. The container may also include a bowl-shaped detachable cover that can be selectively detached and used as a receptacle for water dispensed from the container.

To make the operating member easier to move manually, the operating member may be attached to a dispensing conduit extending outwardly therefrom, and a shaped or other handle may be attached to the dispensing conduit to permit the user to grasp the handle and move the operating member.

The present invention also provides a method of manually purifying and dispensing water from a container, which includes providing a supply of water within a container and utilizing a manually movable operating member to cause the supply water to flow into a conduit; positioning an electrically operated water purifying device close to the water within the conduit and utilizing the manually movable operating member to operate an electric generator electrically connected to energize the water purifying device; and utilizing the manually movable operating member to pump water purified by the water purifying device from the container through the conduit. The method also preferably includes filling the container through an inlet opening having a filter therein.

The method may include positioning a hollow tube member to extend vertically within the container, telescopically mounting the operating member on the hollow tube member for vertical movement relative thereto, and utilizing a check valve to cause the operating member to pump water into and out of the hollow tube member during the vertical movement of the operating member. A compression spring may be utilized to extend between the hollow tube member and the vertically movable operating member to normally urge the operating member in a vertical direction away from the hollow tube member.

Finally, such method preferably includes providing a bowl-shaped detachable cover, selectively attaching the cover to the body of the container to cover the operating member and selectively detaching the cover from the body of the container to provide a receptacle for the purified water dispensed from the container.

DETAILED DESCRIPTION OF THE PREFERRED EMBODIMENTS

Figure 1:
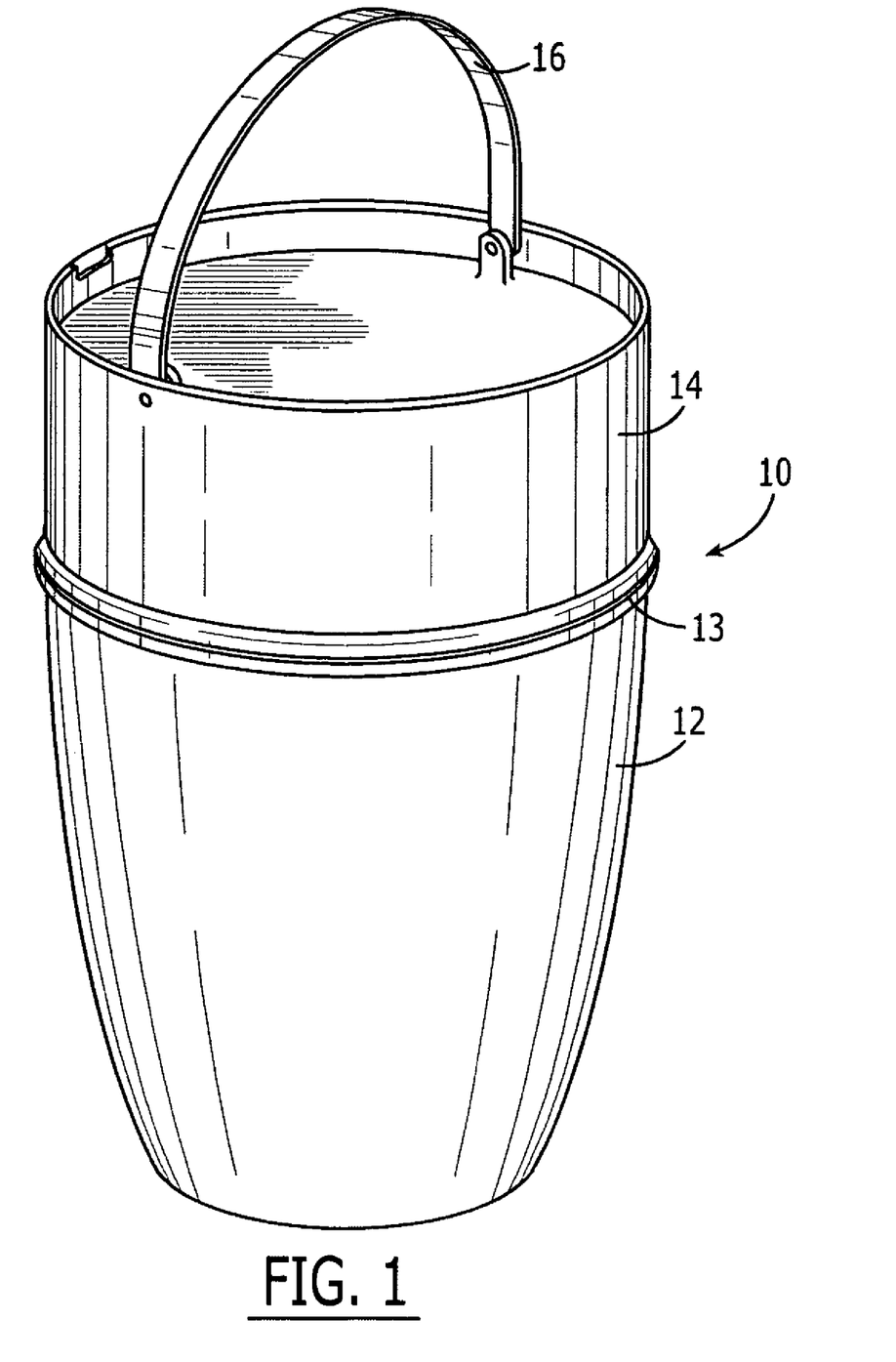
FIG. 1 is a perspective view of one embodiment of the present invention with the cover attached to the body of the container.
Figures 2, 3:
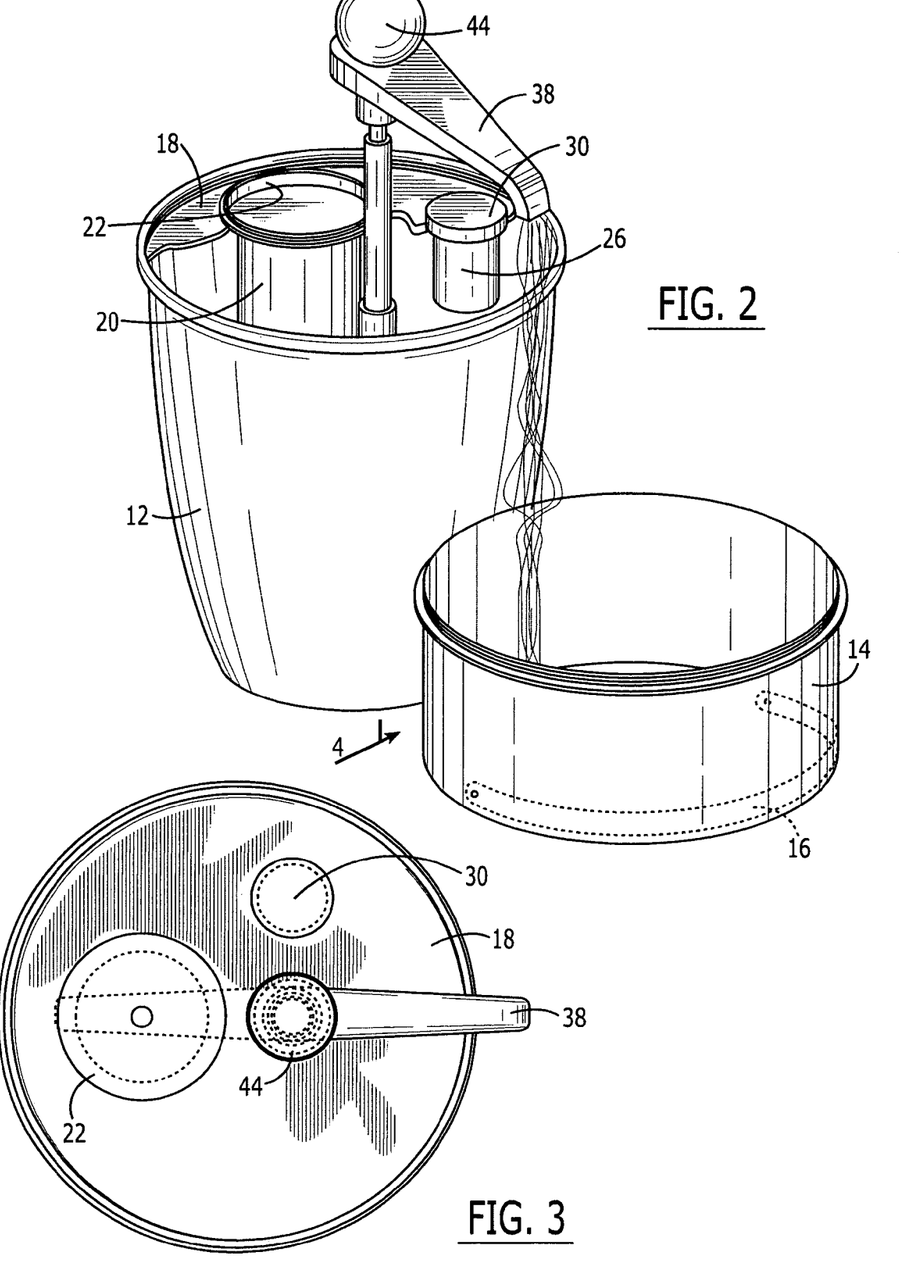
FIG. 2 is a view similar to the view in FIG. 1 with the cover detached from the body of the container.
FIG. 3 is a top view of the container illustrated in FIG. 2.

Looking now in greater detail at the accompanying drawings, FIGS. 1 and 2 are perspective views of one embodiment of the water purifying apparatus of the present invention. The water purifying device includes a container 10 that is preferably circular in configuration and a cover 14 that is threadably connected to a base portion 12 so as to be selectively detachable therefrom. A seal 13, which may be an O-ring or gasket or an equivalent conventional sealing member, is positioned between the base portion 12 and the cover 14 to provide a seal when the cover 12 is attached to the base portion 12 as illustrated in FIG. 1. The cover 14 is bowl-shaped as best illustrated in FIG. 2, and it may be readily detached from the base portion 12 to form a receptacle of water dispensed from the container 10 as will be explained in greater detail below. The cover 14 also is provided with a handle 16 that can be pivoted between a stored position when the cover is serving as a receptacle as illustrated in FIG. 2 and when the cover 14 is attached to the base portion 12 as illustrated in FIG. 4, and an extended position as illustrated in FIG. 1 to act as a handle for carrying the container 10.

As best seen in FIGS. 2 and 3, the top wall 18 of the base portion is formed with an opening in which a generator chamber 20 may be inserted to extend downwardly from the top wall 18. A lid 22 is placed across the top of the generator chamber 20 so that the generator chamber 20 forms a water tight compartment within the base portion 12.

The top wall 18 is also formed with a second opening in which is mounted a filter housing 26 for retaining a filter 28 (see FIG. 4), which is preferably a conventional activated charcoal filter. The filter housing 26 includes a removable filler cap 30 for closing the filter housing 26. When the filler cap 30 is removed, the filter housing 26 constitutes an inlet opening through which the base portion 12 can be filled with water that is initially filtered by the filter 28.

Figure 4:
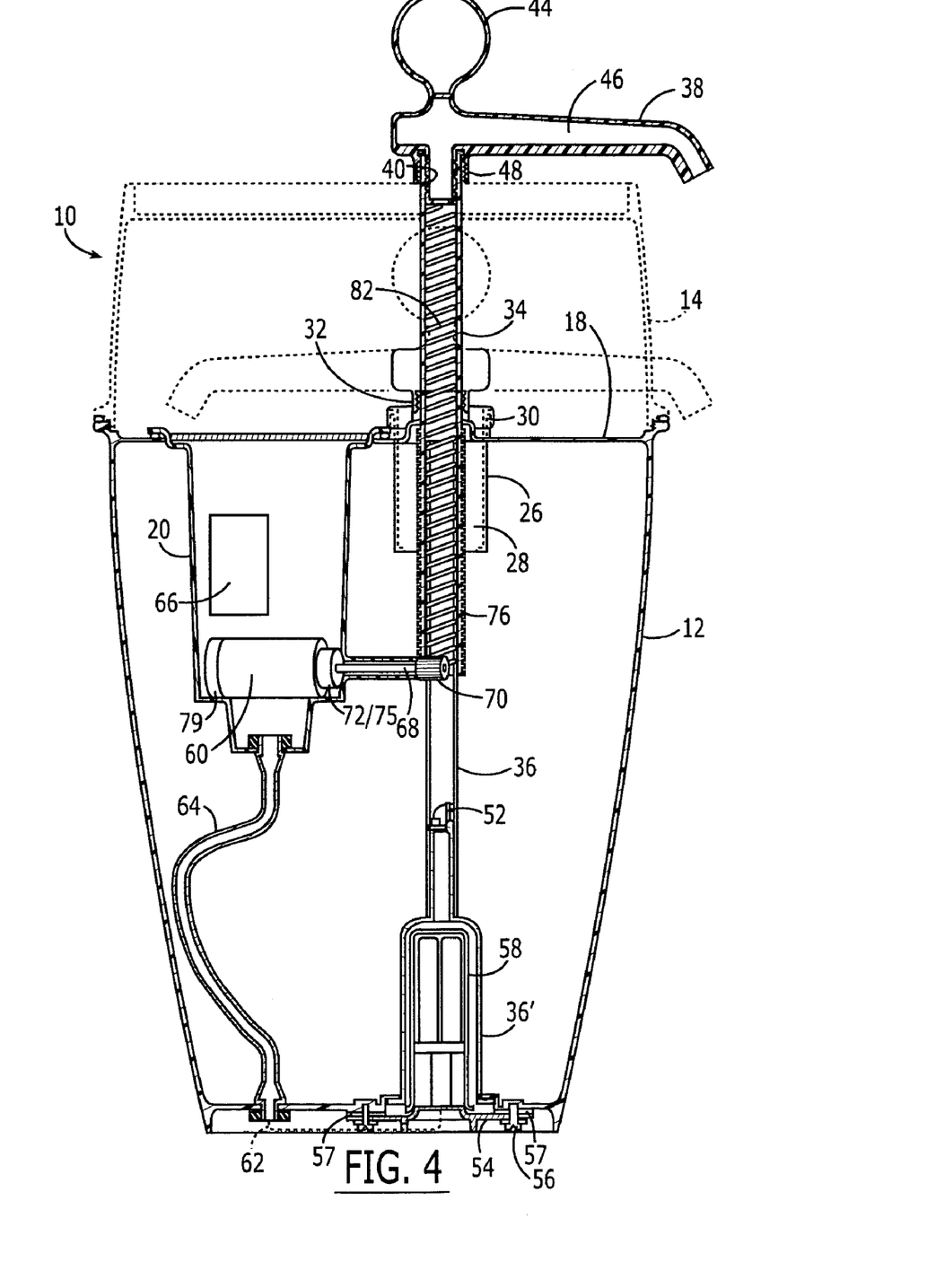
FIG. 4 is a side elevation sectional view taken through the center of the container illustrated in FIG. 1.

As best seen in FIGS. 3 and 4, the top wall 18 of the base portion 12 is formed with an upstanding annular flange 32 having an exterior surface that is threaded. A longitudinally extending hollow tubular member 34 extends downwardly through the annular flange 32 and into the interior of the base portion 12 where it is telescopically mounted for vertical movement on a stationary upstanding hollow tube 36. A dispensing nozzle 38 is mounted at the upper end of the longitudinally extending member 34 by an insert portion 40 so that the longitudinally extending member 34 is in open fluid communication with the interior of the dispensing nozzle 38. A set screw (not shown) may extends through the upper end of the longitudinally extending member 34 and the insert portion 40 to securely hold the dispensing nozzle 38 in place, but also permitting it to be detached from the longitudinally extending member 34, if necessary. The dispensing nozzle 38 is also formed with a generally spherical handle 44, and a conduit 46 that extends outwardly from the longitudinally extending member 34 in open fluid communication therewith. However, it will be understood that the spherical handle 44 could have other shapes designed to be easily grasped by a human hand. Finally, the dispensing nozzle 38 is provided with a downwardly extending annular flange 48 that is threaded along its interior surface for a purpose to be described in greater detail below.

Figure 5:
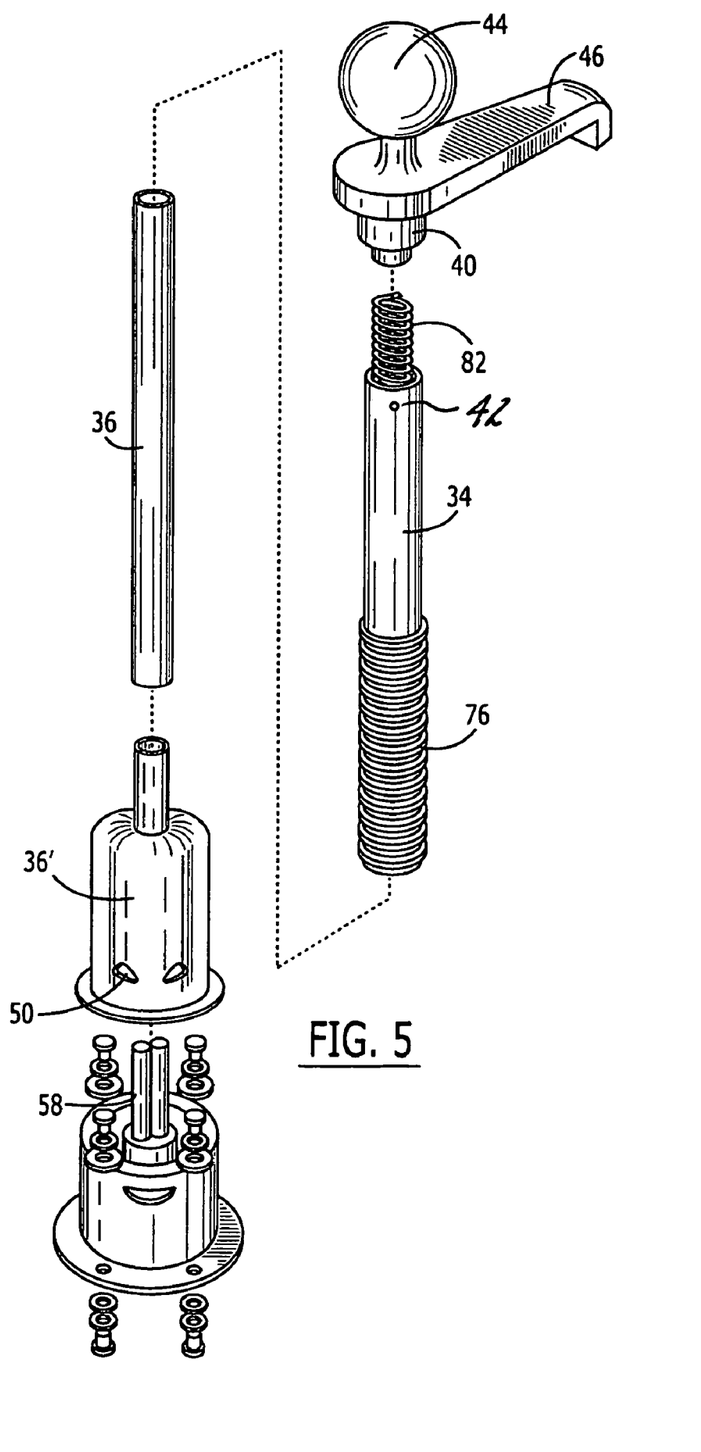
FIG. 5 is a detail exploded view of the manually movable operating member and related elements.

As best seen in FIGS. 4 and 5, the hollow tube 36 includes an enlarged lower portion 36' that includes outwardly extending flanges that are secured to the bottom wall of the base portion 12. The hollow tube 36 and its enlarged lower portion 36' are preferably formed as two separate pieces that are joined together, or they may be one integrally molded piece. Preferably, the hollow longitudinally extending member 34, the hollow fixed tube 36 and the enlarged portion 36' are made from a conventional clear or translucent polymer for a purpose that will be described in more detail below. The enlarged lower portion 36' is provided with a plurality of openings 50 (see FIG. 5) through which water within the base portion 12 can flow into the enlarged lower portion 36'. Also, a check valve 52 (see FIG. 4) is mounted within the hollow tube 36, and in the preferred embodiment of the present invention the check valve is in the form of a conventional flap valve which rotates 90° between an open position at which the flap extends generally parallel to the axis of the hollow tube 36 and a closed position at which the flap extends across the diameter of the hollow tube 36.

The bottom wall of the base portion 12 includes an opening that is normally covered by a bottom cap 54 attached to the bottom wall by screws 56 or equivalent attachment elements, and an O-ring or gasket 57 is disposed between the bottom wall of the base portion 12 and the cap 54 to provide a water tight connection. When the bottom cap 54 is removed, a an electrically operated water purifying means in the form of UV-C lamp 58 can be inserted into the enlarged lower portion 36', and the UV-C lamp 58 is maintained within the enlarged lower portion 36' when the bottom cap is reattached to the bottom wall of the base portion 12, all as best seen in FIG. 4. The UV-C lamp 58 is conventional and may be any one of a number of such lamps that are available on the open market, such as a Phillips Model TUV 5W PL-S lamp which is a 254 namometer lamp. The electrically operated UV-C lamp 58 is electrically connected to an electric generator 60 by an electrical line 62 that extends from the UV-C lamp 58 through a cable conduit 64. The electrical generator 60 is mounted within the above-described water tight generator chamber 20, and, if necessary or desired, a ballast 66 for the generator 60 can also be mounted in the generator chamber 20.

Figure 6:
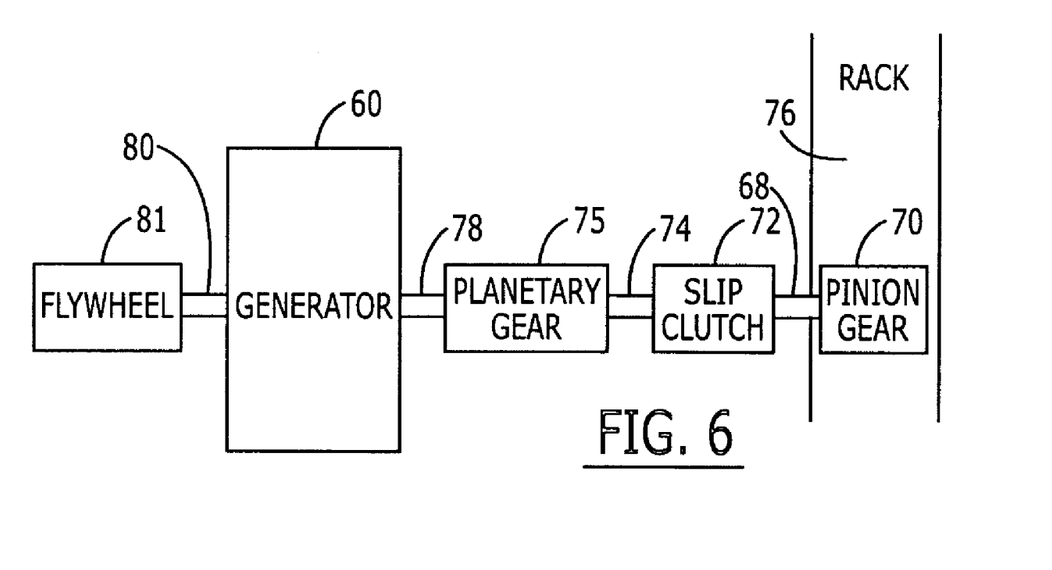
FIG. 6 is a diagrammatic view of the drive train for the generator.

As best seen in FIGS. 4 and 6, the generator 60 is driven through a drive train that includes a pinion gear 70 to mesh with the rack 76 (see FIGS. 4 and 5), fixed to the lower portion of the longitudinally extending member 34 extending around the entire circumference of the longitudinally extending member 34 so that the pinion gear 70 remains in meshing engagement with the rack 76 regardless of the rotational position of the longitudinally extending member 34 and the dispensing nozzle 38. As best seen in FIG. 6, the pinion gear 70 is mounted at the end of a drive shaft 68 which extends to a connection with a conventional slip clutch 72. An output shaft 74 from the slip clutch 72 extends to a conventional planetary gear drive 75 which, in turn, has an output shaft 78 that drives the electric generator 60. This output shaft 78 extends through the electric generator 60 to provide a stub shaft 80 on which is mounted a fly wheel 81. All of the components in the drive train for the electric generator 60 are conventional and can be selected from a variety of such components that are readily available on the open market, depending on the size of water purifying device, the desired output of the electric generator 60, and other variables. The operation of this drive train will be explained in greater detail below.

Figure 7:
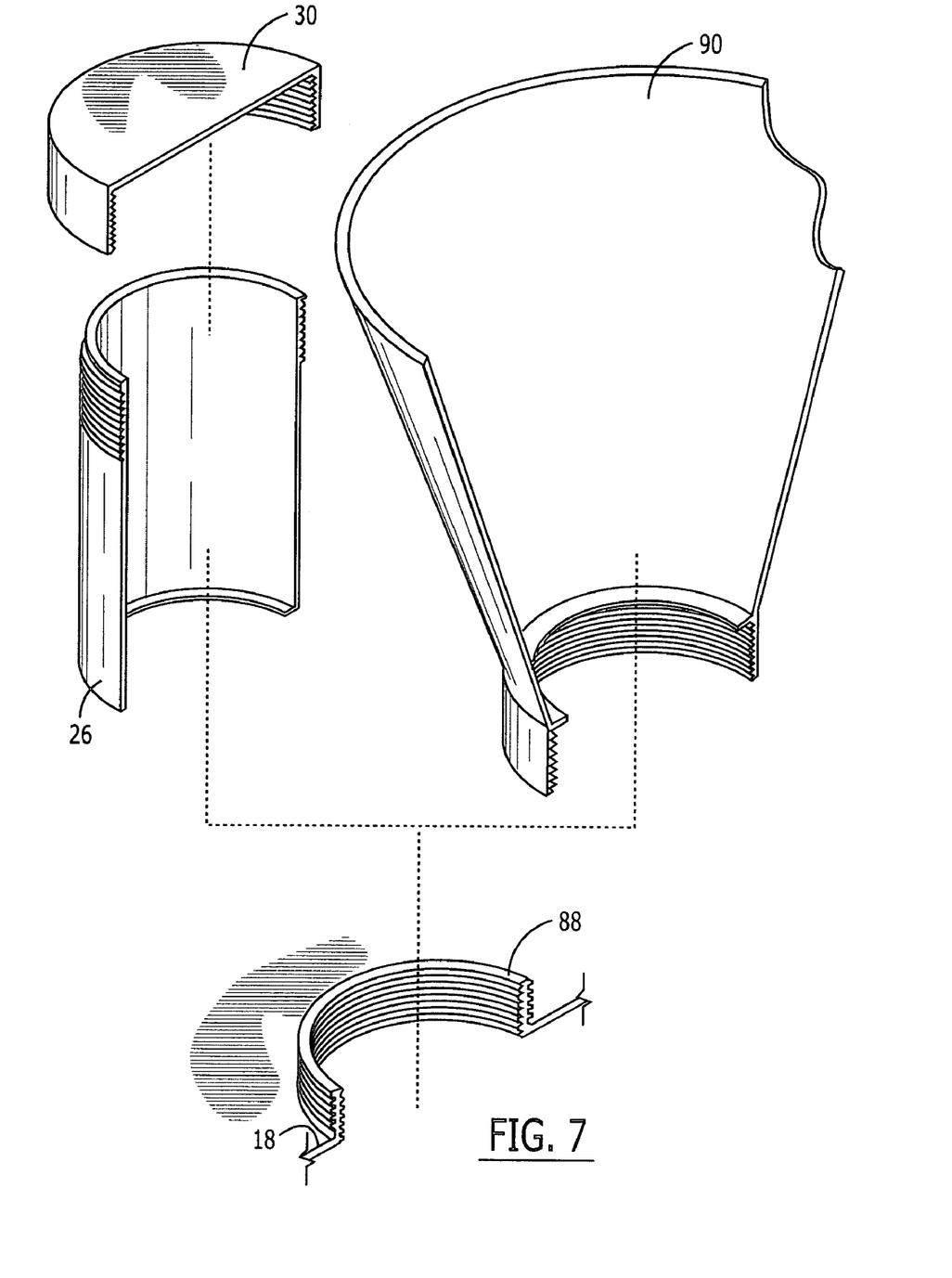
FIG. 7 is a detail view showing an arrangement for filling the container with water.

A unique arrangement for filling the base portion with a supply of water to be purified is illustrated in FIG. 7. The above-described base portion 12 includes a circular flange 88 that projects upwardly from the top wall 18 of the base portion 12, and this flange 88 is threaded at both its interior and exterior surfaces. The filter housing 26 includes exterior threads at its top portion, and the filter housing 26 is mounted in the top wall 18 by engagement with the interior threads on the flange 88. Normally, the opening at the top of the filter housing 26 is closed by the filter cap 30, which is threadably mounted on the exterior threads of the flange 88. When it is necessary to fill the base portion 12 with water the filter cap 30 is rotated and removed from the flange 88, and a funnel 90 having threads at its lower end is screwed onto the exterior threads of the flange 88 in place of the filter cap 30. This funnel 90 makes it easier to pour water into the base portion 12, and when the filling operation is completed, the funnel 90 is removed and replaced with the filter cap 30.

In use, the above-described embodiment of the water purifying device of the present invention is preferably made small enough and light enough that it is portable but large enough to hold a good supply of water. The device can be easily carried from place to place using the handle 16 in its extending position as illustrated in FIG. 1. When it is being transported, or is otherwise not in use, the moveable longitudinally extending member 34 is pushed downwardly by grasping the generally spherical handle 44 and pushing it down against the bias of a coil spring 82 (see FIG. 4) that is interposed between the downwardly extending threaded flange 48 and the fixed hollow tube 36 to normally bias the moveable longitudinally extending member 34 in an upward direction away from the fixed hollow tube 36 as best illustrated in FIG. 4. When the longitudinally extending member 34 is pushed downwardly to the position shown in dotted lines in FIG. 4, the downwardly extending threaded flange 48 engages the threads on the upstanding annular flange 32, and the dispensing nozzle 38 can then be rotated a few turns until the longitudinally extending member 34 is held in place by its threaded engagement with the upstanding annular flange 32, and the dispensing nozzle 38 is located within the confines of the cover 14 as also illustrated in dotted lines in FIG. 4. The cover 14 can then be secured to the base portion 12 by turning the cover 14 until the threaded portion thereof engages the threaded portion of the base portion 12. It will be understood that the coil spring 82 which is seated at both ends thereof could be eliminated, in which case the longitudinally extending member 34 would be moved manually by the user in both its upward and downward directions. While the coil spring 82 provides assistance in automatically urging the longitudinally extending member 34 toward its raised position, it also creates a bias that must be overcome by the user in pushing the longitudinally extending member 34 in its downward direction. Therefore, the water purifying device of the present invention could be produced with or without the coil spring 82.

When it is desired to use the water purifying device of the present invention, the cover 14 is rotated until it is disengaged from the threads of the base portion 12, and the cover 14 can then be turned upside down and placed adjacent to the container 10 as best illustrated in FIG. 2. Because the cover 14 is bowl-shaped, it can serve as a receptacle for purified water dispensed from the water purifying device. The dispensing nozzle 38 is then rotated through a few turns until it is disengaged from the upstanding annular flange 32, and the longitudinally extending member 34 then automatically moves to its most upward position under the influence of coil spring 82 as illustrated in full lines in FIG. 4 if the coil spring 82 is used. If the coil spring 82 is not used the longitudinally extending member 34 is raised manually by the user. The base portion 12 of the container 10 is then filled with unpurified or questionable water which may be available at remote locations by pouring the supply of water into the base portion 12 of the container 10 through the activated charcoal filter 28 using the funnel 90 as described above.

This initial filtration by the activated charcoal filter 28 absorbs organic particles that cause offensive water discoloration, odor, and taste. However, this supply of water is still unpurified to the extent that it may contain unsafe microorganisms.

When it is desired to dispense purified water from the water purifying device of the present invention, the user grasps the generally spherical handle 44 on the longitudinally extending member 34, which is now at its raised position, and pushes downwardly. This downward movement of the longitudinally extending member 34 causes the head of water above the check valve 52 to close the check valve 52, and therefore this downward movement forces any water that is above the check valve 52 and within the fixed hollow tube 36 and the longitudinally extending member 34 to be pumped upwardly through the conduit 46 and the dispensing nozzle 38 where it can be collected in the inverted bowl-shape cover 14 as illustrated in FIGS. 2 and 4, or into any other suitable receptacle (not shown).

At the same time, the downward movement of the rack 76 fixed to the lower end of the longitudinally extending member 34 turns the small pinion gear 70 which causes the electric generator 60 to be operated through the drive shaft 68 and the drive train between the small pinion gear 70 and the generator 60. More specifically, the slip clutch 72 is designed to transmit the rotational input of the drive shaft 68 directly to the planetary gear 75 during downward movement of the longitudinally extending member 34, and the planetary gear 75 is designed to increase the RPMs of the drive shaft 68 and the intermediate shaft 74 to the RPMs required to operate the generator 60. When the electric generator 60 is operated, it generates electrical current which is transmitted through electrical line 62 to the UV-C lamp 58 so that it becomes illuminated and acts to purify water which is in the lower portion of the fixed hollow tube 36 below the check valve 52. Moreover, since the hollow tube 36 and the enlarged lower portion 36' are preferably formed of a clear, translucent polymer as described above, energization of the UV-C lamp 58 causes it to radiate and purify the supply of water contained by the base portion 12, as well as upwardly through both the hollow tube 36, the flap valve 52, and the hollow longitudinally extending member 34. Also, because the hollow tube 36 and the longitudinally extending member 34 are clear or translucent, the user of the water purifying device will be able to easily confirm that the UV-C lamp 58 is operating properly because the light generated by the UV-C lamp 58 will be visible when the longitudinally extending member 34 is in its raised position.

The user then quickly raises the longitudinally extending member 34, which creates a vacuum that opens the check valve 52 and causes unpurified water within the container 10 to be drawn in through the openings 50 and into the fixed hollow tube 36 and upwardly into the hollow longitudinally extending member 34. At the same time, the rack 76 again rotates the pinion gear 70 and the drive shaft 68 in an opposite direction of rotation, as compared with downward movement of the longitudinally extending member 34. In this direction of rotation, the slip clutch 72 slips so that no counter-rotation is applied to the planetary gear 75 and no driving force is applied to the generator 60. However, since the fly wheel 81 is driven with the generator 60 during the downward movement of the longitudinally extending member 34 through stub shaft 80, the inertia of the rotating fly wheel 81 will continue to operate the generator 60 during the upward movement of longitudinally extending member 34 so that if the longitudinally extending member 34 is moved quickly between its downward and upward directions, the generator 60 will be operated continuously to energize the UV-C lamp 58. Thus, as described above, the manually moveable longitudinal member 34 with the rack 76 mounted thereon forms a manually movable operating means for causing water to flow into and out of the conduit 46 and for operating the electric generator 60 to energize the UV-C lamp 58 to purify the water.

By continuously moving the longitudinally extending member 34 upwardly and downwardly in repeated cycles, it will be apparent that during each downward movement of the longitudinally extending member 34 purified water will be dispensed from the container through the dispensing nozzle 38, and during each upward movement of the longitudinally extending member 34 unpurified water is pumped into the fixed hollow tube 36 and the longitudinally extending member 34 which is purified before it is dispensed during the next operating cycle. In some cases where the water purifying device of the present invention has not been used for some period of time, it may be advisable to go through several dispensing cycles without collecting the dispensed water which may not have been fully purified during the start up cycles. Thereafter, any quantity of purified water can be dispensed and collected in the cover 14, as may be desired. It will also be readily apparent that the operation of the longitudinally extending member 34 and the operation of the rack 76 are both entirely manual, and it is not necessary that there be any external power source available to operate the UV-C lamp 58 to fully purify the water that is dispensed.

Figure 8:
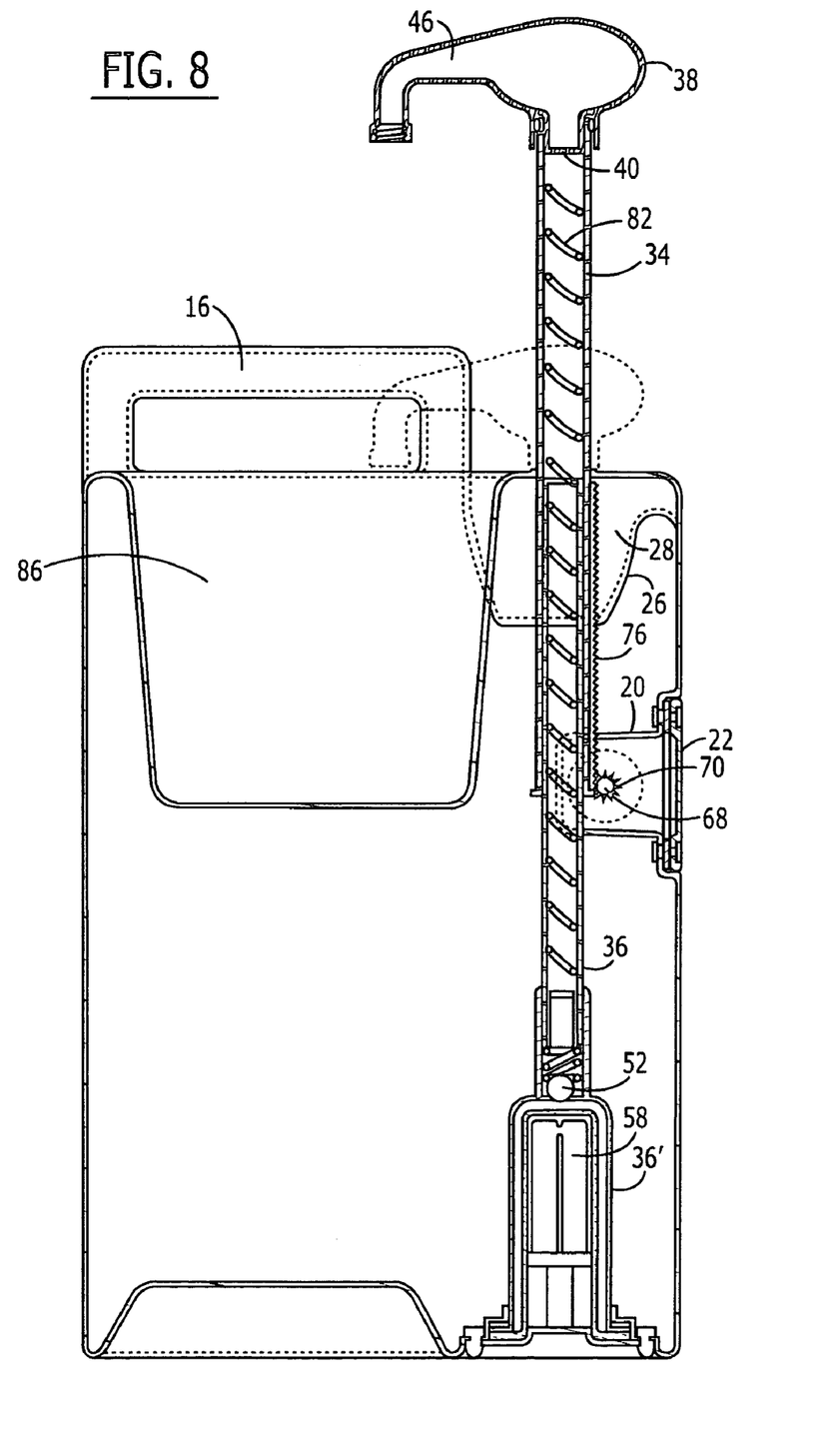
FIG. 8 is a side elevation sectional view of another embodiment of the present invention.

An alternate embodiment of the present invention is illustrated in FIG. 8. The elements illustrated in FIG. 8 which are functionally equivalent to the corresponding elements described above in connection with the embodiment of the present invention illustrated in FIGS. 1–7 have the same reference numerals, and therefore do not require a duplicate description.

In the embodiment illustrated in FIG. 8, there is no detachable cover element, and a receptacle 86 is formed directly in the container 10 itself for receiving water dispensed from the dispensing nozzle 38. The top wall of the container 10 is formed with a fixed handle 16 which permits the device to be easily carried. In this embodiment, the generator chamber 20 is mounted in the side wall of the container 10 rather than the top wall as in the first above-described embodiment. Also, the rack 76 does not extend around the entire circumference of the moveable longitudinally extending member 34, although it could be if desired. Finally, in the FIG. 8 embodiment the dispensing nozzle 38 is shaped to be easily grasps by a human hand, and the user simply grasps the shaped dispensing nozzle 38 itself to move the longitudinally extending member 34 upwardly and downwardly, and in this embodiment the check valve 52 is a conventional spring-loaded ball valve. If desired, the dispensing nozzle 38 could be provided with a spherical handle like handle 44 shown in the embodiment of FIGS. 1–7.

Figure 9:
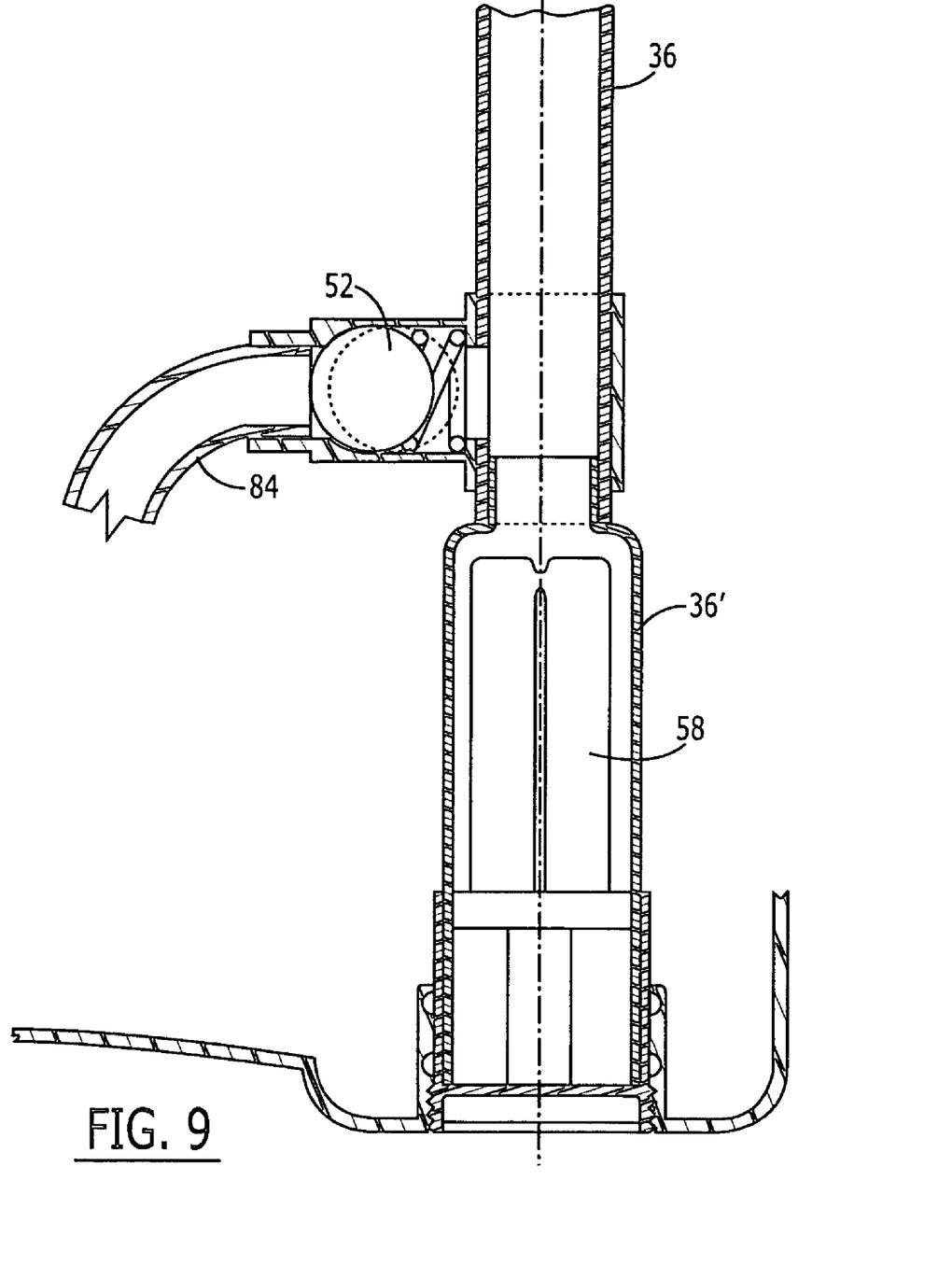
FIG. 9 is a detail view showing an alternate embodiment of the inlet opening for the unpurified water.

FIG. 9 illustrates an alternate embodiment of the location of the check valve 52. In this embodiment, rather than being located within the fixed hollow tube 36, the check valve 52 is attached to an inlet tube 84 that extends to a lower position within the container 10 and an opening in the side wall of the fixed hollow tube 36. If this alternate embodiment of the check valve 52 is used in connection with either of the embodiments illustrated in FIGS. 1–7 or FIG. 8, the lower end of the fixed hollow tube 36 would not have any inlet openings and all of the unpurified water would be pumped into the fixed hollow tube 36 through the inlet tube 84.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. Apparatus for manually dispensing purified water comprising:
   a) a container for holding a supply of water;
   b) a conduit through which the water can be dispensed from the container;
   c) an electrically operated water purifying means positioned within the container to purify water that flows through the dispensing conduit;
   d) an electric generator disposed within the container and electrically connected to the water purifying means for operating the water purifying means; and
   e) a manually movable operating member that pumps water through the dispensing conduit during manual movement thereof, and the operating member being operatively connected to the electric generator to operate the electric generator and the electrically operated purifying means during manual movement of the operating member.

2. Apparatus as defined in claim 1, wherein the operating member is hollow, and wherein a hollow tube member is telescopically mounted within the hollow operating member in open fluid communication therewith and formed with an opening therein through which water within the container can enter the hollow tube, and wherein a check valve is mounted in the tube member to cause water to flow from the operating member and the hollow tube through the dispensing conduit when the operating member is manually moved in one direction relative to the hollow tube and to cause water to flow into the hollow tube through the opening therein when the operating member is manually moved in the opposite direction relative to the hollow tube.

3. Apparatus as defined in claim 2, wherein the water purifying means is disposed within the hollow tube.

4. Apparatus as defined in claim 2, wherein the hollow tube is mounted vertically in the container with the opening located adjacent the lower end thereof, wherein the operating member is telescopically mounted about the upper end portion of the hollow tube for vertical movement relative to the hollow tube, and wherein the dispensing conduit is mounted on the operating member in open fluid communication therewith, whereby vertical movement of the operating member in a downward direction relative to the hollow tube pumps the purified water from the operating member to and from the dispensing conduit and vertical movement of the operating member in the upward direction creates a vacuum within the hollow tube to draw water from the container into the hollow tube through the opening therein.

5. Apparatus as defined in claim 4, wherein a compression spring is disposed within the operating member and the hollow tube to bias the operating member in an upward direction.

6. Apparatus as defined in claim 1, wherein the electric generator includes a drive shaft, and wherein a mechanical drive train is interposed between the operating member and the drive shaft to operate the generator when the operating member is manually moved.

7. Apparatus as defined in claim 6, wherein the operating member has a rack formed thereon and wherein the mechanical drive train includes a pinion mounted in meshing engagement with the rack.

8. Apparatus as defined in claim 1, wherein the water purifying means is a UV-C lamp.

9. Apparatus as defined in claim 1, wherein the container is formed with a waterproof compartment and wherein the electric generator is mounted within the waterproof compartment.

10. Apparatus as defined in claim 1, wherein the container is provided with an inlet opening through which the container can be filled with unpurified water, and wherein a charcoal filter is mounted at the inlet opening to initially filter the unpurified water.

11. Apparatus as defined in claim 10, wherein the filter is an activated charcoal filter.

12. Apparatus as defined in claim 1, wherein the container includes a bowl-shaped detachable cover that can be detached and used as a receptacle for water dispensed from the dispensing conduit.

13. Apparatus as defined in claim 1, wherein the dispensing conduit is attached to the operating member, and wherein a handle shaped to be easily grasp by a human hand is attached to the dispensing conduit to permit the user of the apparatus to grasp the handle and manually move the operating member.

14. A portable device for manually dispensing purified water comprising:
   a) a container for holding a supply of water;
   b) a conduit through which the water can be dispensed from the container;
   c) an electrically operated water purifying means positioned within the container to purify water that flows through the dispensing conduit;
   d) an electric generator mounted on the container and electrically connected to the water purifying means; and
   e) manually movable operating means mounted in the container for (i) simultaneously causing water to flow into the dispensing conduit and operating the electric generator to cause the electrically operated water purifying means to purify water flowing into the dispensing conduit and (ii) dispensing the purified water from the container through the dispensing conduit.

15. A portable device as defined in claim 14, wherein the operating means includes a hollow operating member, and wherein a hollow tube member is telescopically mounted within the hollow operating member in open fluid communication therewith and formed with an opening therein through which water within the container can enter the hollow tube, and wherein a check valve is mounted in the tube member to cause water to flow from the operating member and the hollow tube through the dispensing conduit when the operating member is manually moved in one direction relative to the hollow tube and to cause water to flow into the hollow tube through the opening therein when the operating member is manually moved in the opposite direction relative to the hollow tube.

16. A portable device as defined in claim 15, wherein the water purifying means is disposed within the hollow tube member.

17. A portable device as defined in claim 1, wherein the water purifying means is a UV-C lamp.

18. A portable device as defined in claim 15, wherein the hollow tube in mounted vertically in the container with the opening located adjacent the lower end thereof, wherein the operating member is telescopically mounted about the upper end portion of the hollow tube for vertical movement relative to the hollow tube, and wherein the dispensing conduit is mounted on the operating member in open fluid communication therewith, whereby the vertical movement of the operating member in a downward direction pumps the purified water from the operating member to and from the dispensing conduit and vertical movement of the operating member in the upward direction creates a vacuum within the hollow tube to draw water from the container into the hollow tube through the opening therein.

19. A portable device as defined in claim 18, wherein a compression spring is disposed within the operating member and the hollow tube to bias the operating member in an upward direction.

20. A portable device as defined in claim 14, wherein the electric generator includes a drive shaft, and wherein a mechanical drive train is interposed between the operating member and the drive shaft to operate the generator when the operating member is manually moved.

21. A portable device as defined in claim 20, wherein the operating member has a rack formed thereon and wherein the mechanical drive train includes a pinion mounted in meshing engagement with the rack.

22. A portable device as defined in claim 14, wherein the water purifying means is a UV-C lamp.

23. A portable device as defined in claim 14, wherein the container is formed with a waterproof compartment and wherein the electric generator is mounted within the waterproof compartment.

24. A portable device as defined in claim 14, wherein the container is provided with an inlet opening through which the container can be filled with unpurified water, and wherein an activated charcoal filter is mounted at the inlet opening to initially filter the unpurified water.

25. A portable device as defined in claim 14, wherein the container includes a detachable cover that can be detached and used as a receptacle for water dispensed from the dispensing conduit.

26. A portable device as defined in claim 14, wherein the dispensing conduit is attached to the operating means, and wherein a shaped handle is attached to the dispensing conduit to permit the user of the portable device to grasp the handle and manually move the operating means.

27. Apparatus for manually dispensing purified water comprising:
  a) a container for holding a supply of water;
  b) a conduit through which the water can be dispensed from the container;
  c) an electrically operated water purifying means positioned within the container to purify water that flows through the dispensing conduit;
  d) an electric generator disposed within the container and electrically connected to the water purifying means for operating the water purifying;
  e) a first manually movable member mounted on the container for movement that pumps water from the container through the conduit to be dispensed from the container, wherein the first manually moveable member is a longitudinally extending member that includes a handle portion for manually moving it; and,
  f) a second manually movable member mounted for movement that operates the electric generator to cause the water purifying means to purify the water dispensed from the container through the dispensing conduit, wherein the second manually moveable member is a gear driving device mounted on the longitudinally extending member for movement therewith.

28. Apparatus for manually dispensing purified water as defined in claim 27, wherein the longitudinally extending member is hollow and is telescopically mounted on a hollow tube within the container for relative movement therewith to pump the purified water from the container, wherein a drive drain is interposed between the electric generator and includes a drive shaft for the electric generator and a pinion mounted on the drive shaft, and wherein the gear driving device is a rack that meshes with the pinion for operating the electric generator.

29. A portable device for manually dispensing purified water comprising:
  a) a container for holding a supply of water, the container having a detachable cover and being formed with an interior watertight compartment, and the container having an inlet through which the container can be filled with unpurified water and a charcoal filter mounted at the inlet opening to initially filter the unpurified water;
  b) a hollow tube member mounted in the container to extend upwardly therein, the hollow tube member having at least one inlet opening in the bottom end portion thereof and having a check valve mounted in the follow member so as to permit water to flow from the container into the hollow tube member through the opening and so as to prevent water from flowing out of the tube member into the container through the opening;
  c) a manually movable hollow operating member telescopically mounted on the hollow tube member in open fluid communication therewith for vertical movement relative to the hollow tube member to cause water to flow into the hollow tube member through the opening and the check valve when the operating member is moved in one direction of vertical movement and to cause water to be blocked by the check valve from flowing out through the opening and to flow out of the operating member when the operating member is moved in the opposite direction of vertical movement;
  d) a dispensing nozzle mounted on the operating member to extend outwardly therefrom, the dispensing nozzle being in open fluid communication with the operating member to dispense water from the container when the operating member is moved in its opposite direction of vertical movement;
  e) a rack element fixed to the operating member for movement therewith;
  f) an electric generator disposed within a watertight compartment of the container, the electric generator being driven by a drive shaft and a mechanical drive train that includes a pinion gear mounted in meshed engagement with the rack; and
  g) an electrically operated UV-C lamp disposed within the hollow tube and being electrically connected to the electric generator to be energized thereby when the operating member is moved vertically, whereby when the operating member is manually moved in its vertical directions the water in the container flows into the hollow tube and the UV-C lamp is energized by the electric generator to purify the water and the purified water is pumped from the container through the dispensing nozzle.

30. Apparatus for manually dispensing purified water comprising:
  a) a conduit through which the water can be pumped and dispensed;
  b) an electrically operated water purifying means positioned in the conduit for purifying the water within the conduit;
  c) an electric generator electrically connected to the water purifying means to supply electric current for operating the water purifying means; and
  d) a manually movable operating member mounted for movement that (i) pumps water into the conduit and out of the conduit and (ii) drives the electric generator to generate the current for operating the water purifying means.

31. A method of manually purifying and dispensing water, including;
  a) providing a supply of water;
  b) utilizing a manually movable operating member to cause the supply water to flow into a conduit;
  c) positioning an electrically operated water purifying means within the conduit;
  d) utilizing the manually movable operating member to operate an electric generator electrically connected to energize the water purifying means; and
  e) utilizing the manually movable operating member to pump water purified by the water purifying means from the container through the conduit.

32. A method of manually purifying and dispensing water as defined in claim 31, wherein providing a supply of water includes filling a container with supply water that passes through an inlet opening having a filter therein.

33. A method of manually purifying and dispensing water as defined in claim 31, wherein utilizing the manually operating member to operate an electric generator includes moving a rack mounted on the operating member to rotate a gear train for operating the electric generator.

34. A method of manually purifying and dispensing water as defined in claim 31, wherein utilizing a manually movable operating member to cause the supply water to flow into the conduit includes positioning the conduit to extend vertically within the container, telescopically mounting the operating member on the vertical conduit for vertical movement relative thereto, and causing water to flow into and out of the conduit during the vertical movement of the operating member.

35. A method of manually purifying and dispensing water as defined in claim 31, wherein the method includes utilizing a biasing member to bias the operating member in a vertical direction away from the conduit.

36. A method of manually purifying and dispensing water as defined in claim 31, wherein the method includes utilizing a check valve to control the flow of supply water through the conduit.

37. A method of manually purifying and dispensing water as defined in claim 31, wherein the method includes positioning a dispensing nozzle to extend generally horizontally outwardly from the operating member in fluid communication therewith, and causing the purified water to be dispensed from the container through the dispensing nozzle.

38. A method of manually purifying and dispensing water as defined in claim 31, wherein the method includes locating a grasping handle adjacent the top of the operating member and grasping the handle to cause the vertical movement of the operating member.

39. A method of manually purifying and dispensing water as defined in claim 31, wherein the method includes selectively attaching a bowl-shaped cover to the body of the container to cover the operating member and detaching the cover from the container to provide a receptacle for the purified water dispensed from the container.

* * * * *